United States Patent
Ohkado

(10) Patent No.: US 6,728,756 B1
(45) Date of Patent: Apr. 27, 2004

(54) INFORMATION PROCESSING METHOD, COLLABORATION SERVER, COLLABORATION SYSTEM, AND STORAGE MEDIUM FOR STORING AN INFORMATION PROCESSING PROGRAM

(75) Inventor: Akira Ohkado, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/576,723

(22) Filed: May 23, 2000

(30) Foreign Application Priority Data

Jun. 16, 1999 (JP) .......................... 11-169990

(51) Int. Cl.[7] .............................. G06F 15/16
(52) U.S. Cl. ................. 709/205; 709/204; 709/219; 345/751; 715/513
(58) Field of Search ................. 709/204, 205, 709/219; 345/731, 751; 715/513

(56) References Cited

U.S. PATENT DOCUMENTS

| | | | | |
|---|---|---|---|---|
| 6,144,991 A | * | 9/2000 | England | 709/205 |
| 6,256,389 B1 | * | 7/2001 | Dalrymple et al. | 379/900 |
| 6,298,356 B1 | * | 10/2001 | Jawahar et al. | 707/201 |
| 6,334,141 B1 | * | 12/2001 | Varma et al. | 709/205 |
| 6,353,851 B1 | * | 3/2002 | Anupam et al. | 709/204 |
| 6,567,848 B1 | * | 5/2003 | Kusuda et al. | 709/219 |

FOREIGN PATENT DOCUMENTS

| | | | | |
|---|---|---|---|---|
| JP | 11-025042 | 1/1999 | ........... | G06F/15/00 |
| JP | 2000-112862 | 4/2000 | ........... | G06F/13/00 |
| WO | 0077660 | 4/2000 | ........... | G06F/17/60 |

OTHER PUBLICATIONS

Makoto Kobayashi, "Collaborative customer services using synchronous Web browser sharing" Proceedings of the 1998 ACM conference on Computer supported cooperative work Nov. 1998, pp. 99–108.*

"An Awareness Supported Method to Construct the Environment for Realtime Collaboration in WWW", by Kenichi Nakagawa and Susumu Kunifuji, vol. 39, No. 10, Oct. 1998, pp. 2820–2827.

* cited by examiner

Primary Examiner—Hosain Alam
Assistant Examiner—Liang-che Wang
(74) Attorney, Agent, or Firm—Jerry W. Herndon; Carstens, Yee & Cahoon LLP

(57) ABSTRACT

To display contents desired by a user in one information terminal onto another information terminal having no special software for collaboration when collaboration is performed through internets. If a customer clicks on a "call button" with a browser, an agent who performs collaboration is assigned. The browser on the customer side shows both a screen starting a default and an object giving instructions to display the next page. The screen on the agent side shows the number of a document to which the customer refers, and the agent can change this number. If the customer selects the object giving instructions to display the next page, a hypertext makeup language (HTML) including that object is generated based on the document number changed by the agent, the HTML being transmitted to the customer side.

2 Claims, 8 Drawing Sheets

FIG. 3

Session Management Table 31

| Section ID 311 | Agent ID 313 | Customer ID 315 | Present displayed contents 317 | Present displayed contents Supplement 319 | Next 321 | Next supplement 323 | Return screen 325 |
|---|---|---|---|---|---|---|---|
| 0001 | 01 | 2233 | 0001 | 2 | Continuation | | www.abc.com |
| 0003 | 02 | 0141 | 0002 | 0 | 9001 | | |
| ⋮ | ⋮ | ⋮ | ⋮ | ⋮ | ⋮ | ⋮ | ⋮ |

FIG. 4

Document Management Table 330

| Material ID 331 | Contents 333 | Type 335 | Number of pages 337 | Document place 339 | Session ID 341 | Agent Script 343 |
|---|---|---|---|---|---|---|
| 0001 | Introduction of product ABC | Pages | 5 | | | |
| 0002 | Exterior of Product DEF | Single page | N/A | | | |
| 0003 | Specification of product DEF | Single page | N/A | | | |
| 9001 | N/A | Temporary | N/A | | 0003 | |

FIG. 5

Document Set Management Table 350

| Set ID 351 | Page number 353 | Document place 355 | Contents 357 | Agent Script 359 |
|---|---|---|---|---|
| 0001 | 1 | | Outline of product ABC | |
| 0001 | 2 | | Characteristics of product ABC | |
| 0001 | 3 | | Comparison with another company product | |

FIG. 6

Agent Management Table 370

| Agent ID 371 | Log-in name 373 | Status 375 | Extension number 377 | Additional information 379 |
|---|---|---|---|---|
| 01 | SUZUKI1 | Ready | 1111 | |
| ⋮ | ⋮ | ⋮ | ⋮ | ⋮ |

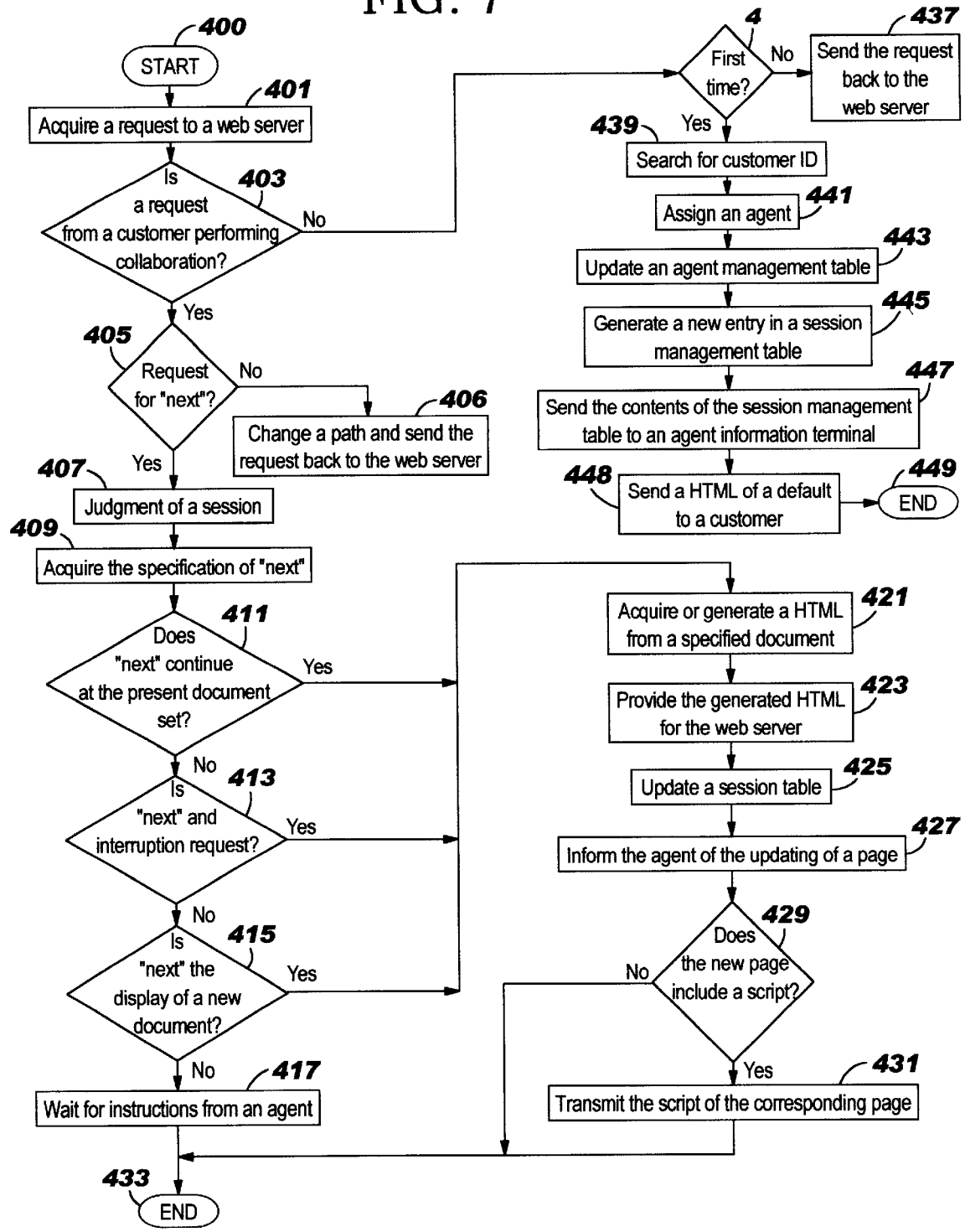

FIG. 10

Customer Information — 700

Please fill up the following blanks

1. Name — 701
   [            ]

2. Available Telephone Number — 703
   [            ]

3. Company Name/Group Name/School Name (Department, Section, etc.)
   An individual does not need to fill it up. — 705
   [                                    ]

[ OK ] — 721
[ Cancel ] — 723

Introduction of Product ABC — 513

[ Next ] — 511

Present displayed contents: Introduction of product ABC (3/5 page)
Next specification: Continuation
Customer Information

[ Change ] — 551

Name: Yamada Taro
  Purchase History:
    •
    •
    •

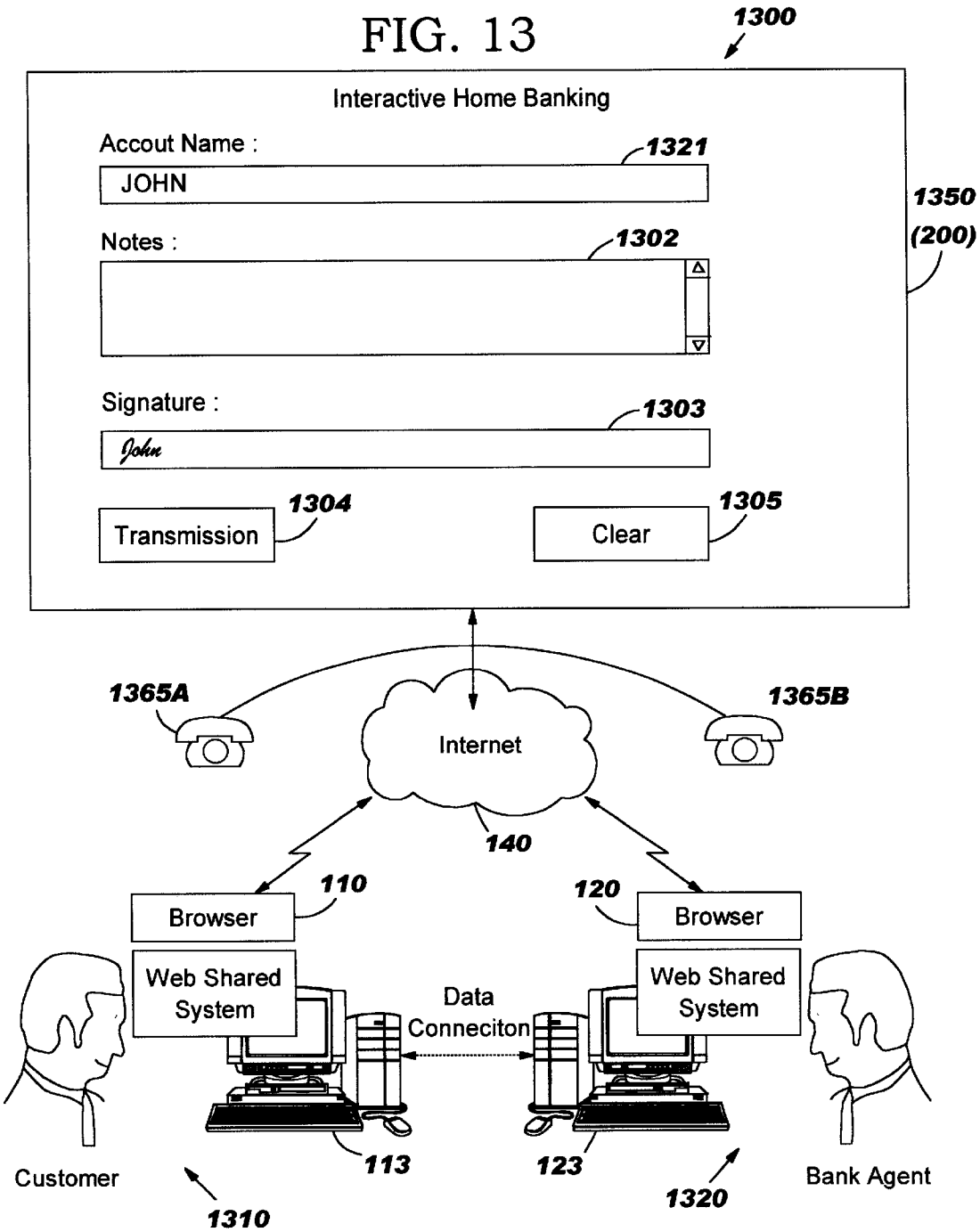

INFORMATION PROCESSING METHOD, COLLABORATION SERVER, COLLABORATION SYSTEM, AND STORAGE MEDIUM FOR STORING AN INFORMATION PROCESSING PROGRAM

BACKGROUND OF THE INVENTION

This invention relates to an information processing method, and more particularly to a method of changing the contents of a document, to which a user in one information terminal refers, by another user in the other information terminal collaborating with the one information terminal, in accordance with circumstances.

At the time of the application of the present invention, collaboration techniques have been proposed so that a plurality of users can perform a collaborative operation (browse, movement, or change) for a HTML page at the same time, as in Published Unexamined Japanese Patent Application No. 10-124461. FIG. 13 is a diagram showing an example of the fact that this collaborative operation for a HTML page is applied to an internet banking system. By using such techniques, an agent for a bank, an agent for an internet customer consultation center, or the like can refer to the same page as a customer and operate it.

However, conventional collaboration tools for a browser are based on a specific browser or based on a specific operating system. For this reason, in high-value member services, which distribute software incorporated PCs or are premised on the assumption that a specific OS or browser is introduced, there will be no problem. However, in the case of dealing with many and unspecified persons, such as when a consulting function is desired to be added to web sites, collaboration cannot be performed with respect to customers making access under an unsupportable environment.

OBJECTS OF THE INVENTION

An objective of the present invention is to provide a system that is capable of freely displaying the contents desired by a user in one information terminal on another information terminal with no special software for collaboration, when collaboration is performed.

Another objective of the invention is to provide a low-cost collaboration system that reduces the resource necessary for collaborating with an information terminal.

Still another objective of the invention is to provide a collaboration system where it becomes possible to control collaboration between itself and an information terminal unitarily.

A further object0ive of the invention is to provide a collaboration system entirely independent of the kinds of the platform/browser of an information terminal to be operated.

These and other objects will be addressed by the present invention and, in particular, by the preferred embodiment presented.

SUMMARY OF THE INVENTION

If a customer clicks on a "call button" with a browser, an agent who performs collaboration is assigned. The browser on the customer side shows a default start up screen and an object to display the next page. The screen on the agent side shows the number of a document to which the customer refers as the next page, and the agent can change this number. If the customer selects the object to display the next page, a hypertext makeup language (HTML) including that object is generated based on the document number changed by the agent, the HTML being transmitted to the customer side.

In accordance with one aspect of the present invention, there is provided an information processing method that is executed within a system including a collaboration server connected to both a customer information terminal and an agent information terminal, the method comprising the steps of:

(a) sending a first message from the customer information terminal to the collaboration server, the first message giving instructions to perform collaboration;

(b) selecting an agent that collaborates with the customer information terminal;

(c) sending a second message to display an object on the customer information terminal along with predetermined information, the object giving instructions to send a next-page request;

(d) displaying first information and second information onto a screen of the agent information terminal, the first information specifying information being presently displayed on a screen of the customer information terminal and the second information specifying information to be displayed next on the screen of the customer information terminal;

(e) sending, in the agent information terminal, a third message to instruct the collaboration server to change the second information in response to receiving input giving instructions to change the second information;

(f) receiving, a fourth message by the collaboration server, the fourth message being generated by operating the object in the customer information terminal; and (g) sending the information, specified by the third message received from the agent information terminal, from the collaboration server to the customer information terminal. In the claims of this specification, the "object giving instructions to send a next-page request" is a concept including menus such as clickable buttons, icons, and pull-down menus.

In accordance with another aspect of the present invention, there is provided an information processing method that is executed within a system including a collaboration server connected to both a customer information terminal and an agent information terminal, the method comprising the steps of:

(a) sending a first message to display an object on the customer information terminal along with predetermined information from the collaboration server, the object giving instructions to send a next-page request;

(b) displaying first information and second information onto a screen of the agent information terminal, the first information specifying information being presently displayed on a screen of the customer information terminal and the second information specifying information to be displayed next on the screen of the customer information terminal;

(c) sending, in the agent information terminal, a second message to instruct the collaboration server to change the second information in response to receiving input giving instructions to change the second information;

(d) receiving, a third message by the collaboration server, the third message being generated by operating the object in the customer information terminal; and (e) sending the information, specified by the second message received from the agent information terminal, from the collaboration server to the customer information terminal.

In accordance with still another aspect of the present invention, there is provided an information processing method that is executed within a system including a collaboration server connected to both a customer information terminal and an agent information terminal to hold the information for specifying a document to be displayed next on a screen of the customer information terminal, the method comprising the steps of:

(a) sending a first message to the customer information terminal; where the first message displays an object giving instructions to send a next-page request along with predetermined information;

(b) updating the information held by the collaboration server in response to receiving a message, giving instructions to change the information specifying the document to be displayed as next page, from the agent information terminal; and (c) sending document corresponding to the updated information in response to the request sent from the customer information terminal.

In accordance with a further aspect of the present invention, there is provided a collaboration server to be connected to both a customer information terminal and an agent information terminal, the collaboration server comprising:

(a) a session management table for managing information which specifies a session between the customer information terminal and the agent information terminal and next-page information which specifies a document to be displayed next on the customer information terminal;

(b) a session management section for updating the next-page information in response to receiving a message giving instructions to change from the agent information terminal, information to be next displayed; and (c) a next-page document generation section for generating a document corresponding to the updated next-page information in response to a next-page request sent from the customer information terminal.

In the claims of this specification, the "next-page document generation section" is a concept including a "HTML generation section" to be described in an embodiment of the present invention.

In accordance with a further aspect of the present invention, there is provided a collaboration system including a collaboration server connected to both a customer information terminal and an agent information terminal, the collaboration system comprising:

(a) the customer information terminal for sending a first message to the collaboration server, the first message giving instructions to perform collaboration;

(b) the collaboration server including (b1) a session management table for managing information which specifies a session between the customer information terminal and the agent information terminal and next-page information which specifies a document to be next displayed on the customer information terminal; (b2) a session management section for updating the next-page information in response to receiving a second message from the agent information terminal, the second message giving instructions to change information to be next displayed; and (b3) a next-page document generation section for generating a document corresponding to the updated next-page information in response to a next-page request sent from the customer information terminal; and (c) the agent information terminal for sending a third message to the collaboration server, the third message giving instructions to update the next-page information.

In accordance with a further aspect of the present invention, there is provided a storage medium for storing an information processing program that is executed within a system including a collaboration server connected to both a customer information terminal and an agent information terminal to hold first information for specifying a document to be next displayed on a screen of the customer information terminal, the program comprising:

(a) a program code for instructing the collaboration server to send the customer information terminal a first message to display an object along with predetermined information, the object giving instructions to send a next-page request;

(b) a program code for instructing the collaboration server to update the information specifying the document to be displayed as next page held by the collaboration server in response to receiving a message, giving instructions to change the first information, from the agent information terminal; and (c) a program code for instructing the collaboration server to send data corresponding to the updated information specifying the document to be displayed as next page in response to the next-page request sent from the customer information terminal.

BRIEF DESCRIPTION OF THE DRAWINGS

FIG. 3 is a conceptual diagram of a session management table in the preferred embodiment of the present invention;

FIG. 4 is a conceptual diagram of a document management table in the preferred embodiment of the present invention;

FIG. 5 is a conceptual diagram of a document set management table in the preferred embodiment of the present invention;

FIG. 6 is a conceptual diagram of an agent management table in the preferred embodiment of the present invention;

FIG. 7 is a flowchart showing the operational procedure of a collaboration system in the preferred embodiment of the present invention;

FIG. 10 is an image diagram of a window to be displayed on the screen of the customer information terminal in the preferred embodiment of the present invention;

FIG. 11 is an image diagram of a window to be displayed on the screen of the customer information terminal in the preferred embodiment of the present invention;

FIG. 12 is an image diagram of a window to be displayed on the screen of an agent information terminal in the preferred embodiment of the present invention; and FIG. 13 is a diagram for explaining a conventional collaboration technique.

PREFERRED EMBODIMENT OF THE PRESENT INVENTION

The present invention will now be described in detail with respect to a preferred embodiment. The preferred embodiment is not meant to limit or restrict the invention in any way, but merely as an example to teach the skilled user how to implement the invention.

Figure 1:
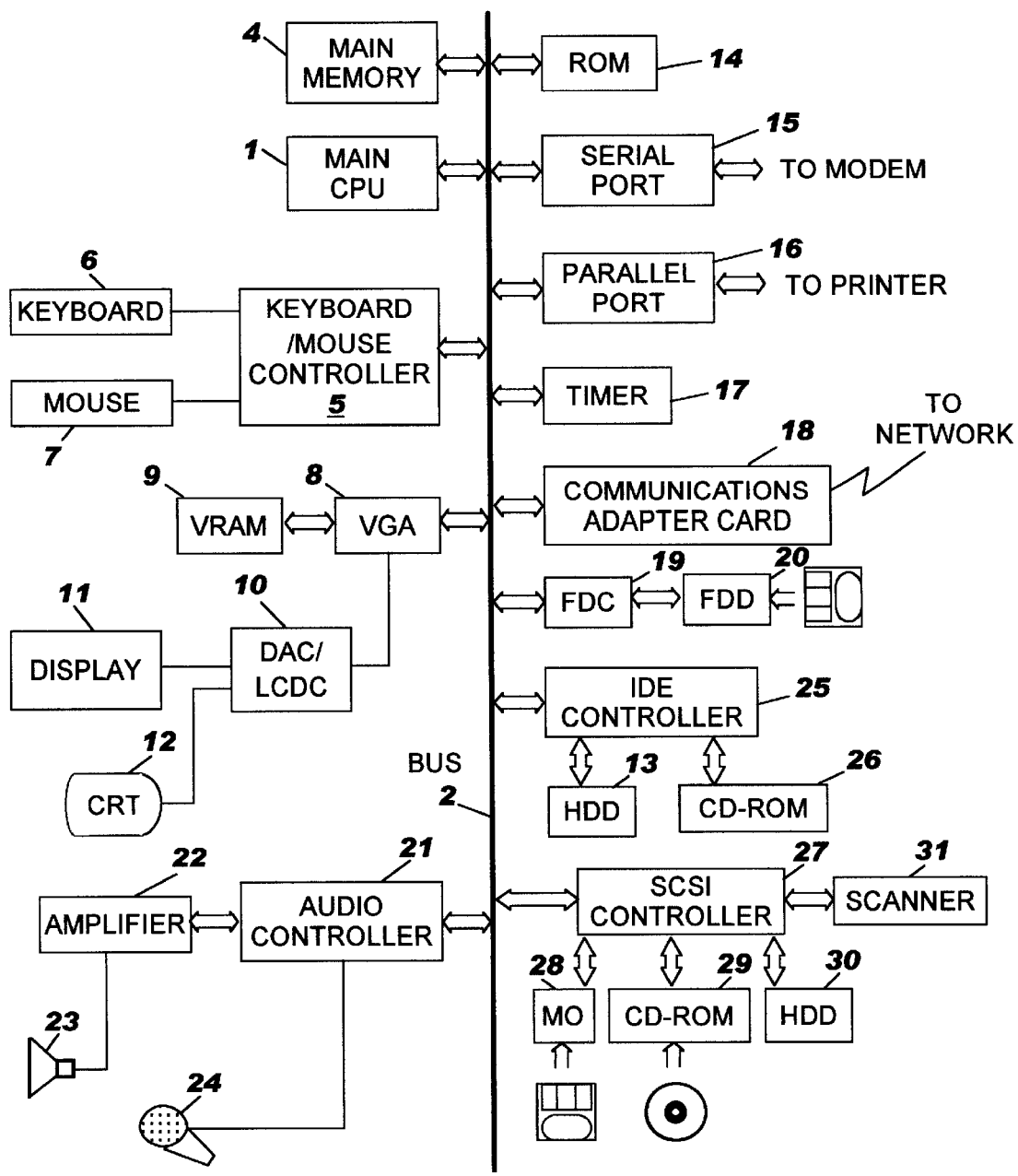
FIG. 1 is a block diagram showing an embodiment of the hardware configuration of a collaboration server or information terminal of the present invention.

Referring to FIG. 1, there is shown a block diagram showing an embodiment of the hardware configuration of a collaboration server 110 to be used in the present invention. The collaboration server 110 includes a central processing unit (CPU) 1 and memory 4. The CPU 1 and the memory 4 are connected with a hard disk drive 13 serving as an auxiliary storage device through a bus 2. A floppy disk drive (or drives 26, 28 and 29 for a storage medium such as an MO, a CD-ROM or the like) 20 is connected on the bus 2 through a floppy disk controller 19 (an IDE controller 25, a SCSI controller 27, or the like).

A floppy disk (or a storage medium such as an MO, a CD-ROM or the like) is inserted into the floppy disk drive (or a drive for a storage medium such as an MO or a CD-ROM) 20. This floppy disk, etc. or the hard disk drive 13 or a ROM 14 can give a command to the CPU or the like in cooperation with an operating system (OS) and store the codes of a computer program for carrying out the present invention, the computer program being executed by loading the codes to the memory 4. The codes of this computer program can be compressed, or divided into a plurality of parts and recorded on a plurality of media.

The collaboration server 110 is further equipped with user's interface hardware and can have a pointing device (e.g., a mouse, a joy stick, etc.) 7 or keyboard 6 for inputting data and a display 12 for presenting visual data to users. A touch panel can also be used as an input means. It is also possible to connect a printer through a parallel port 16 and to connect a modem through a system serial port 15. This collaboration server 110 can be connected to a network through the serial port 15 and the modem or through a communication adapter 18 (Ethernet or a token ring card) or the like, in order to communicate with another computer, etc.

A speaker 23 receives an analog audio signal converted by an audio controller 21 through an amplifier 22 and outputs it as voice. The audio controller 21 converts analog audio information received from a microphone 240 to digital audio information, thereby making it possible to take external audio information into the system.

Thus, it can easily be understood that the collaboration server 110 is executable by means of an information terminal with a communication function, including a normal personal computer (PC), a workstation, a notebook PC, a palmtop PC, a network computer or the like, or a combination of them. Note that these components are merely examples and all the components are not always indispensable to the present invention.

Particularly, some of the hardware components described here are dispensable for collaborating with information terminals, so the audio controller 21, amplifier 22, speaker 23, and microphone 24 necessary for processing a voice, the keyboard 6, mouse 7, and keyboard-mouse controller 5 for enabling an operator to input data directly, and the CRT 12 for providing0 visual data to a user, display 11, VRAM 9, VGA 8, and various storage medium processing units 19, 25, and 27 may be omitted.

The components of this collaboration server 110 can be implemented by a combination of machines having a function corresponding to each component. Various changes will also be apparent to those having skill in this field. Therefore, such changes are to be regarded as being within the scope of the present invention.

An information terminal 130 to be used in the present invention, as with the collaboration server 110, can be executed by means of the hardware configuration shown in FIG. 1. That is, all that is required to the information terminal 130 is to input a request to acquire information and to have the function of transmitting and receiving the request. Therefore, it can easily be understood that the information terminal 130 is executable by means of an information terminal with a communication function, including a normal personal computer (PC), a workstation, a notebook PC, a palmtop PC, various household appliances such as a television set incorporating a computer, a game machine with a communication function, a telephone, a facsimile, a portable telephone, a PHS, an electronic pocketbook or the like, or a combination of them. Note that these components are merely examples and all the components are not always indispensable to the present invention.

The operating system (OS) on the side of the collaboration server 110 is executable by an OS supporting a GUI multi-window environment in standard, such as Windows NT (Microsoft trademark), Windows 9x (Microsoft trademark), Windows 3.x (Microsoft trademark), OS/2 (IBM trademark), Mac OS (Apple trademark), Linux (Linus Torvlds trademark), X-WINDOW system (MIT trademark) on AIX (IBM trademark) or the like. It is also executable by a character-based OS, such as PC-DOS (IBM trademark), MS-DOS (Microsoft trademark) or the like, and furthermore by a real time OS, such as OS/Open (IBM trademark), Vx Works (trademark of Wind River Systems, Inc.) or the like, and an OS incorporated in a network computer, such as Java OS or the like. Thus, the OS on the side of the collaboration server 110 is not to be limited to a specific operating system environment.

The operating system (OS) on the side of the information terminal 130 is executable by an OS supporting a GUI multi-window environment in standard, such as Windows NT (Microsoft trademark), Windows 9x (Microsoft trademark), Windows 3.x (Microsoft trademark), OS/2 (IBM trademark), Mac OS (Apple trademark), Linux (Linus Torvlds trademark), X-WINDOW system (MIT trademark) on AIX (IBM trademark) or the like. It is also executable by a character-based OS, such as PC-DOS (IBM trademark), MS-DOS (Microsoft trademark) or the like, and furthermore by a real time OS, such as OS/Open (IBM trademark), Vx Works (trademark of Wind River Systems, Inc.) or the like, and an OS incorporated in a network computer, such as Java OS or the like. Thus, the OS on the side of the information terminal 130 is not to be limited to a specific operating system environment.

Figure 2:
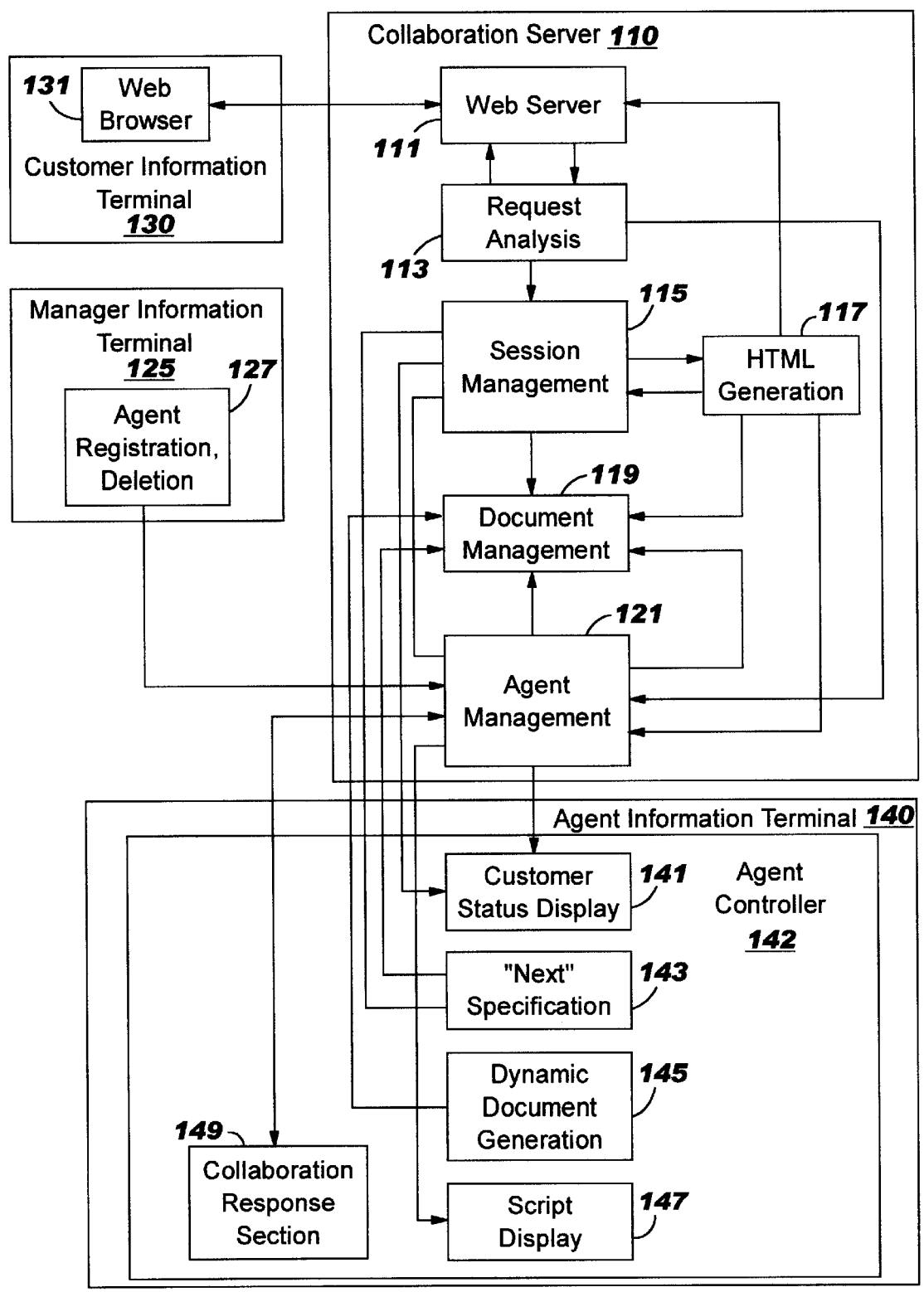
FIG. 2 is a block diagram of the processing elements in a preferred embodiment of the present invention.

FIG. 2 is a functional block diagram showing the configuration of a collaboration system 100 including a collaboration server 110 in a preferred embodiment of the present invention.

The collaboration system 100 in the preferred embodiment of the present invention includes a customer information terminal 130, an agent information terminal 140, and a collaboration server 110.

In the preferred embodiment of the present invention, a web browser 131 is mounted on the information terminal 130. The web browser 131 specifies a uniform resource locator (URL) and transmits a request to a specified web server. The web browser 131 also receives a response transmitted from the web server 111 and displays it on the screen thereof.

The collaboration server 110 in the preferred embodiment of the present invention is provided with the web server 111, a request analyzing section 113, a session management section 115, an HTML generation section 117, a document management section 119, and an agent management section 121.

The web server 111 receives a hypertext transfer protocol (HTTP) request transmitted from the web browser 131 and acquires information corresponding to the request, the information being sent back in HTTP response form to the web browser 131. The request analyzing section 113 monitors the HTTP request arriving at the web server 111 and checks whether or not the HTTP request is a request in a predetermined format.

The session management section 115 manages the session between an agent and a customer and also controls a document to be supplied to a customer. FIG. 3 is a conceptual diagram of a session management table 310 that the session management section 115 manages, in the preferred embodiment of the present invention.

The session management table 310 in the preferred embodiment of the present invention is basically a dynamic table and holds information about the session ID 311 and the session itself (the agent ID 313 and the customer ID 315) and information about the control of a display. The information about the session ID 311, agent ID 313, customer ID 315, presently displayed contents 317, presently displayed contents supplement 319, next page 321, next page supplement 323, and return screen 325 are managed.

The session ID 311 is information for specifying a session between a customer and an agent. The agent ID 313 is information for specifying the agent assigned to the session; the customer ID 315 is information for specifying the customer corresponding to the agent. In the preferred embodiment of the present invention, when the customer has been registered, this customer ID is assigned.

The presently displayed contents 317 are information for specifying a document displayed presently to a customer; the presently displayed contents supplement 319 is information for supplementing the information. In the preferred embodiment of the present invention, when the contents 317 being presently displayed is a document comprising a plurality of pages, the contents 317 will have the present page number 319 as a supplement. The next page 321 is information for specifying a document to be next displayed to a customer; the next page supplement 323 is information for supplementing the information. The contents of next page 321 are continuation or the number of the next document. The "continuation" is used when a document comprising a plurality of pages is displayed in sequence. The next page 321 also has information giving instructions to perform either interruption or switching as a supplement so that reference can temporarily be made to another document during the explanation of a document comprising a plurality of pages (323). When the number of the document interrupted becomes "present displayed contents" and the number of the document being displayed becomes "next", as a supplement, information indicating which page to be returned is held. When the interruption in the middle of the display of a document, comprising a plurality of pages, and interruptions of a plurality of levels are desired to be supported, the addition of a necessary field can meet such a case. Note that when a customer clicks on a "next" button to process the request, a "next" field is cleared, excluding "continuation" specification and the aforementioned case of interruption (the present is exchanged for the next). The return screen 325 is information for specifying information to be displayed on the browser screen of a customer after collaboration has ended.

The document management section 119 consists of a document management table 330 (FIG. 4) for registering all documents and a document set management table 350 (FIG. 5) for managing a document comprising a plurality of pages. The document management table 330 manages document ID 331, contents explanation 333 (which an agent uses for selection), document type 335 (a single page, a plurality of pages, temporary), the number of pages 337 (case of the plural), document archiving place 339 (path name), session ID 341, and agent script 343. If necessary, it is also possible to hold an archiving place for an agent script (text for a document explainer) (not shown).

When a document previously prepared is insufficient, the dynamic document generation section 145 generates a new document by means, such as means for capturing a screen by executing an application program, means for displaying the existing document, adding explanation, and capturing, or the like, and registers the new document in the document management table. The document management table temporarily registers the new document as a temporary document and further has a session ID so that the new temporary document can be displayed only in a specific session.

The document management table 330 and the document set management table 350 include contents (which is used for judging whether an agent displays a document at an intermediate page) and a place for each page of a document. The document set is usually generated on the assumption that a certain specific commodity is explained, so the table holds the script for the explanation as agent scripts 359, 343.

The agent management section 121 manages the status of an agent and assigns an agent to a customer. FIG. 6 is a conceptual diagram of an agent management table in the preferred embodiment of the present invention. The agent management table 370 manages agent ID 371, log-in name 373, status 375, extension number 377, and additional information 379. The contents of this agent management table can be added, changed, or deleted by means of the agent registering-deleting section 127 of a manager information terminal 125.

On the other hand, the agent information terminal 140 is provided with a customer status display section 141, a "next" specification section 143, a dynamic document generation section 145, a script display section 147, and a collaboration response section 149. The customer status display section 141 is a component for displaying a status on a customer side, such as a document being presently displayed on a customer side, a document to be next displayed or the like, to an agent.

The "next" specification section 143 is a component for specifying a document to be next displayed to a customer. The dynamic document generation section 145 is a component for dynamically generating a document to be displayed to a customer. The script display section 147 is a component for displaying an explanation script to a customer.

When a request to assign an agent is transmitted from the collaboration server 110, the collaboration response section 149 displays a response button on the screen of an agent information terminal so that an agent can respond to the request, and informs the collaboration server 110 side that the button has been pushed.

While each functional block shown in FIG. 2 has been described, these functional blocks are logical blocks and do not mean that each block is realized by each discrete hardware or software. The functional blocks are realizable by composite or common hardware and software. Also, all the functional blocks shown in FIG. 2 are not always indispensable components for the present invention.

Figure 8:
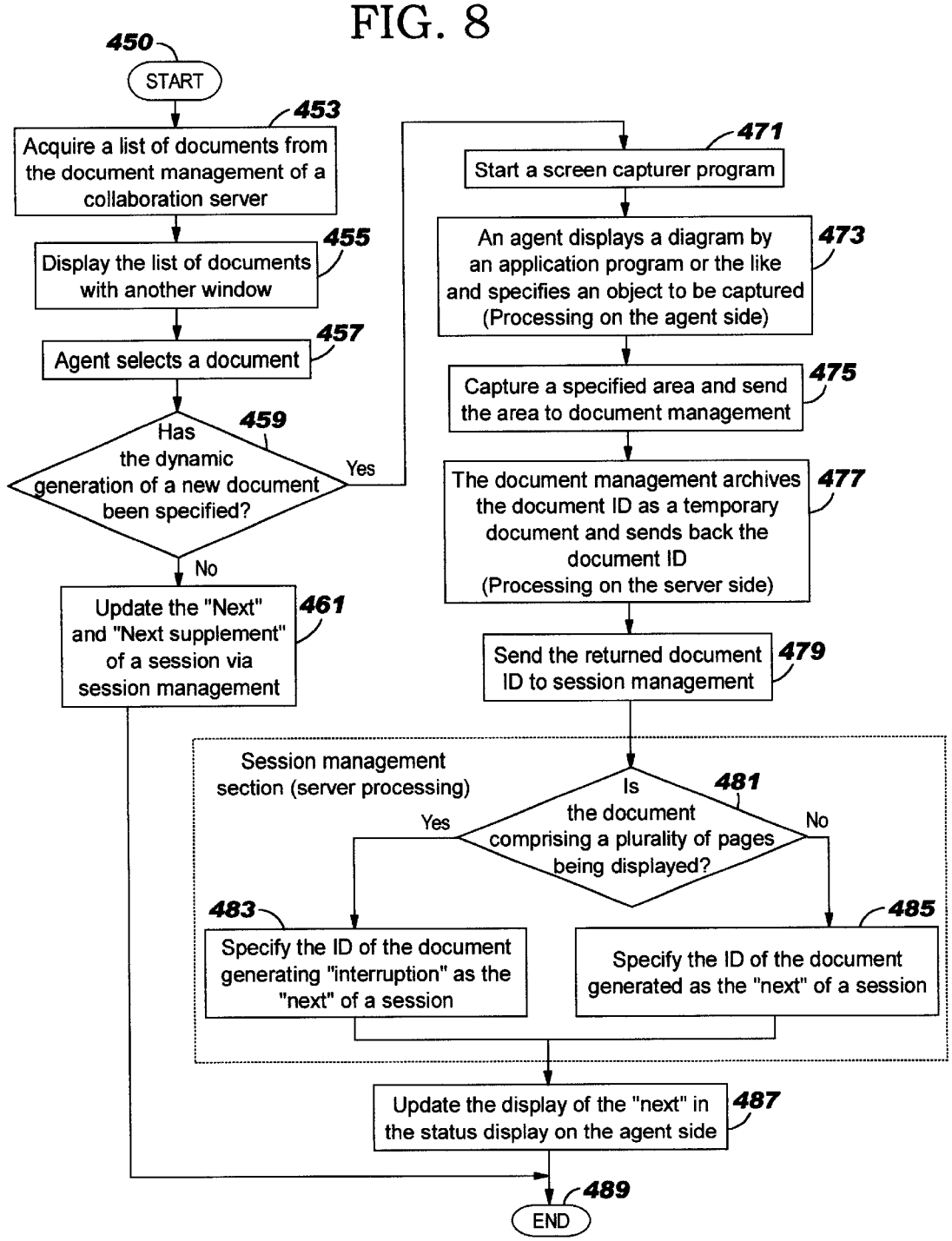
FIG. 8 is a flowchart showing the operational procedure of the collaboration system in the preferred embodiment of the present invention.
Figure 9:
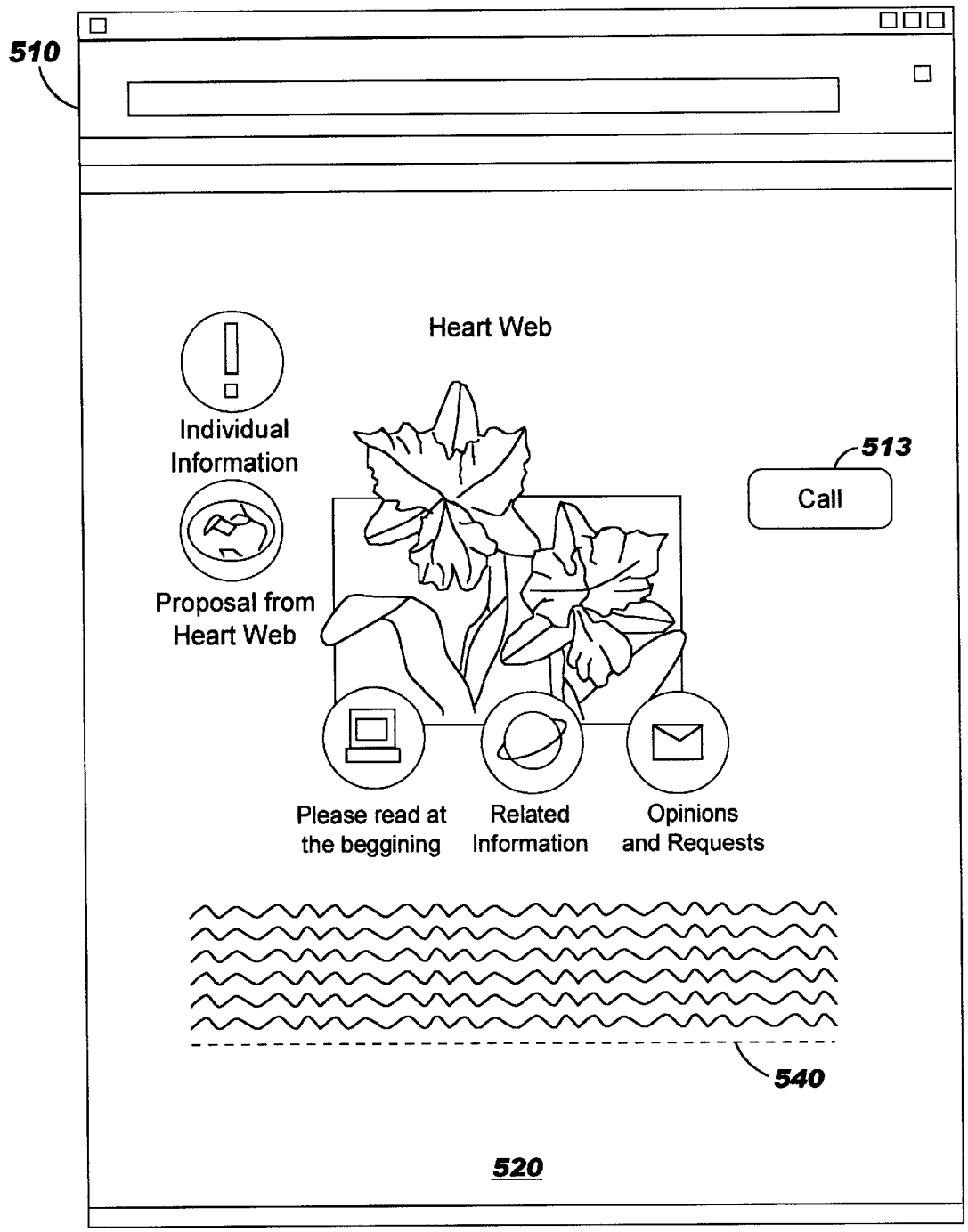
FIG. 9 is an image diagram of the screen of a customer information terminal in the preferred embodiment of the present invention.

FIGS. 7 and 8 are flowcharts showing the operational procedure of the collaboration system 100 in the preferred embodiment of the present invention. In the initial state, a user has had access to the home page of a customer support center and a screen such as that shown in FIG. 9 has been displayed on the browser of a customer. On the home page of the customer support center in the preferred embodiment of the present invention, a web browser main screen 520 is displayed as shown in the figure.

A "call" button 513 is a button that is used when a customer calls an agent. By means of this "call" button 513, a customer information input panel 700 is displayed. If a customer clicks on an "OK" button 721 at the customer information input panel 700, the agent management section 121 is started via the web server 111 and the request analyzing section 113, and assignment of agents and generation of a collaboration session are performed.

FIG. 10 is a diagram showing an example of the customer information entry panel in the preferred embodiment of the present invention. The customer information entry panel 700 in the preferred embodiment of the present invention has entries 701, 703, 705 for inputting a name, a telephone number, and one's position information.

The information, input with this customer information entry panel 700, is saved in Cookie if the "OK" button 721 is pushed. As a parameter for HTTP GET or POST command, the information is also sent to the agent management section 121 via the web server 111 and the request analyzing section 113. When agent assignment is successful, these pieces of information are transmitted as part of a message relative to the collaboration response section 149.

In the preferred embodiment of the present invention, the information, input with this customer information input panel 700, is saved in Cookie. This is to make re-entry unnecessary in the customer information input panel 700, when agents are all busy and customer canceled the request.

In the customer information input panel of the aforementioned embodiment, the information, input with this customer information input panel 700, is saved in Cookie on the assumption that the browser support scripting and Cookie, in order to enhance customer friendliness. This is dispensable for carrying out the present invention. By omitting saving the information input by the customer information input panel, it is also possible to support the browser, which does not support a script or Cookie, as an object of collaboration.

If this "OK" button 721 is pushed, an HTTP message is transmitted from the web browser 131 to the collaboration server 110 side. FIG. 6 is a flowchart showing the procedure on the collaboration side that receives this message. When the collaboration server 110 receives the HTTP message (step 401), the server first determines whether or not it is a request from a customer already in collaboration with the server (step 403).

More specifically, the request analyzing section 113 monitors an HTTP message reaching the web server 111 and discriminates messages by whether or not the HTTP message includes a session name in a predetermined format. In the preferred embodiment of the present invention, a server name, a path name, and a session ID are embedded in the HTTP message during collaboration. In the first time message, both a special path name not existing in the collaboration server 110 and a session ID of a special value indicating the first time are embedded (step 435).

When the session portion ID of the HTTP request is neither a normal session ID nor a session ID indicating the first time, the HTTP message is sent back to the web server 111 (step 437).

When customer information is being managed, a customer ID can also be acquired by searching for customer information database (DB), based on the customer number or telephone number in the HTTP message (step 439). Simultaneously, it is also possible to display information input at a customer information page or information obtained by searching for the customer information DB based on the input information onto an agent terminal. Note that since a session can be uniquely identified by a session ID or a customer ID, the customer ID is not a component indispensable for the present invention.

In the case where the collaboration response section 149 of the agent information terminal 140 has been integrated into a call center, it is possible to display an arrival of incoming call through a CTI (computer telephony integration) client installed in the agent information terminal; and assign agents by a CTI server by implementing the agent assignment function of the agent management section 121 as a CTI application (step 441). In addition to the arrival of an incoming call, it is possible to display customer information accumulated by a CTI system, such as a contact history. On the other hand, when it is not integrated into a call center, it is also possible to display a message, "Please call a customer when you respond," to instruct an agent to initiate outbound call manually. For a more detailed discussion on the case integrated into a call center, see Japanese Patent Application No. 10-318547.

When the agent management section 121 of the collaboration server 110 acquires a request to assign agents, the section 121 refers to the agent management table 370 and searches for an available agent and then send the message to the collaboration response section 149 of the agent.

In response to this, the collaboration response section 149 displays a message to notify the arrival of a collaboration request and also shows a response button on the screen. At this time, by including customer information in the message to be transmitted from the collaboration server 110 to the collaboration response section 149, the customer information can also be displayed along with the collaboration request.

If an agent clicks on the response button, a response is sent from the collaboration response section 149 back to the agent management section 121 and agent assignment is established. The agent management section 121 updates the status 375 of the agent management table 370 to in-collaboration (step 443) and informs the session management section 115 of an agent ID and a customer ID.

The session management section 115 assigns a session ID and adds a new entry to the session management table (step 445). In the present displayed contents 317, the document number of a default document indicating that collaboration has been started is put, and in the "next" page 321, the document with the highest frequency in use is set with a default. FIG. 11 is a conceptual diagram of a document to be displayed on a customer side. Disposed in document 510 is a "next" button. A return screen can set the URL of HTML being displayed on the screen on a customer side before collaboration is performed, or a predetermined URL.

When the session management section 115 adds a new entry to the session management table, information about the entry is transmitted to the customer status display section 141 of an agent information terminal (step 447). FIG. 12 shows an example of a panel generated by the customer status display section 141 in the preferred embodiment of the present invention.

Note that when the agent information terminal 140 has been integrated into CTI and a customer has input a telephone number or when a customer has been identified from information such as a customer number and a telephone number has been registered in the customer information DB, at this point in time an outbound telephone call can be initiated from the PBX to that telephone number.

The document with the default shown in FIG. 11 is transmitted to a customer side via a web server. In the "next" button 511 in this default document, the server name of the collaboration server 110, a path name for judging whether or not the procedure in the present invention is started, and the corresponding session ID are embedded as a URL by an "HTML" generation section 117, and then sent to a customer side (step 448). The collaboration server 110 then waits for receiving the next HTTP message (step 449).

In the preferred embodiment of the present invention, in this status an agent and a customer have a conversation with each other through a telephone, by referring to the screens of the information terminals. An agent confirms the contents of a query and then instructs a customer to push the "next" button 511.

When a customer clicks the "next" button 511 on the browser 131, an HTTP request, including information about a server name, a path name, and a session ID, is transmitted from the browser 131 on the customer side to the collaboration server 110, because the URL, including the server name, the path name, and the session ID, has been embedded in the "next" button 511.

The web server 111 of the collaboration server 110 receives HTTP requests (step 401). The web server 111 delivers all the received HTTP requests to the request analyzing section 113 of the collaboration server 110.

During collaboration, the request analyzing section 113 analyzes an HTTP request, thereby judging whether or not it is a request from a customer performing collaboration (step 403) and whether or not it is a "next" request (step 405). In this status, the session ID included in the HTTP request has a predetermined format and the path name is a special one not existing in the collaboration server 110, so that the request analyzing section 113 determines that the analyzed HTTP request is a "next" request.

When the analyzed HTTP request is a "next" request, the request analyzing section 113 informs the session management section 115 that the "next" request has come. When the HTTP request is not a "next" request, the request analyzing section 113 returns the request back to a web server, and lets the web server handle the request as a normal web request (step 406). Note that it is possible to pass requests other than the HTML request through the session management section, but the load will increase and therefore data for collaboration will be stored in a special path and the request analyzing section 113 can convert a path name and send it back to a web server. When security is important, for a request to this specific path, only a request from a user (and an agent) performing collaboration is accepted, whereby a request from a user other than that can also be denied.

The session management section 115, informed of the arrival of a "next" request, makes a session identification (step 407). In the preferred embodiment of the present invention, the information in the session management table 310 corresponding to the session ID included in a HTTP request is acquired. When the session ID corresponding to the session management table 310 is not present, an error message, indicating that a session has been disconnected, is sent to a user. Note that in the preferred embodiment of the present invention, while a session is identified by means of a session ID, the session can be identified by identifying a user or the like, using an existing method such as a Cookie, hidden form or the like.

When a session is identified, the session management section 115 checks the contents to be displayed next in the session management table 310 (step 409). It is determined whether or not the next document 321 is: "continuation," "interruption," or "a new document number" (steps 411, 413, 415). When it is not any of them, request the "HTML" generation section 117 to send a customer side a message for displaying "Please wait for instructions from an agent" (step 417). The message is transmitted to a web browser via the web server 111.

When contents to be next displayed are any of "continuation," "interruption," or "a new document number," the session management section 115 delivers a document number and the number of pages to the "HTML" generation section 117 and then instructs the "HTML" generation section 117 to generate a HTML to be next displayed. The "HTML" generation section 117 refers to the document management section 119 to acquire contents to be next displayed, then buries a "next" button to complete an HTML, and requests the web server 111 to make a response (step 421). The web server 111 sends this response back to the browser of a customer (step 423).

Thereafter, the "HTML" generation section 117 informs the session management section 115 of the end of processing. The session management section 115 refers to the document management section 119 and updates the presently displayed contents 317, presently displayed contents supplement 319, next-page contents 321, and next-page supplement 323 of the session management table 310. More specifically, the presently displayed contents 317 are updated based on the next-page contents 321. When the contents of the next-page supplement 323 are not "interruption" and the value of the presently displayed contents supplement 319 is less than the number of pages of the document management table 330, the presently displayed contents supplement 319 is incremented by 1 and the next-page contents 321 are set to "continuation."

When the contents of the next-page supplement 323 are not "interruption" and the value of the present displayed contents supplement 319 is equal to the number of pages of the document management table 330, "end" is set to the next-page contents 321. When the contents of the next-page supplement 323 is "interruption," the status before interruption is set.

The "HTML" generation section 117 next informs the agent management section 121 of updating of a page and the number of a new page. The agent management section 121 informs the customer status display section 141 within a system on an agent side of updating of a page and the number of a new page so that an agent can recognize contents being displayed on a customer side. The agent management section 121 also refers to the document management section 119 and judges whether or not there is a script (step 429). If there is a script, it is also transmitted to an agent side (step 431).

Explaining the displayed contents of a browser with a method such as a telephone, an agent determines contents to be next displayed. When a customer's question is one of the expected ones, it is possible to explain a set of documents in sequence. At this time, there is no need to give instructions to the "next" specifying function of an agent. When the question is not the expected one but the document for question is available, switching to a new document can be specified by using the next-specifying function. Furthermore, when a question an agent captures is an application or the screen of a browser at the place and inputs it as a temporary document to the document management section by using "dynamic document generation," whereby it can be specified as "next." If a page to be next displayed is determined, an agent instructs a customer to push the "next."

FIG. 8 is a flowchart explaining the operational procedure of the agent information terminal 140. If, in the display panel of the customer status display section 141 shown in FIG. 12, an agent pushes a change button 551, the customer status display section 141 has access to the document management section 119 through the agent management section 121 and acquires a list of documents, the list being displayed on another window (steps 453, 455).

Along with the list of documents and the explanation thereof, the other window has a check box giving instructions to perform interruption and a check box giving instructions to dynamically generate a document. An agent can selectively select the check box giving instructions to generate a document dynamically. The agent can also select one of a list of documents after selecting the check box giving instructions to perform interruption. Furthermore, the agent can select a document without selecting any check box giving instructions to perform interruption.

When dynamic generation of a new document is not instructed (step 459), the session management section 115 updates the information about the next page 321 and next-page supplement 323 of the session management table 310 (step 461).

When an agent gives instructions on the dynamic generation of a new document, control is shifted to the dynamic document generation section 145, which starts a screen capture program (step 471). The agent specifies an object to be captured, by displaying a diagram with an application program or the li0ke (step 473). The screen capture program captures a specified area and transmits it to the collaboration server 110 side. In response to this, the document management section 119 adds the captured area to the document management table 330 as a temporary document (step 477). When the document management table 330 adds the temporary document, document ID 331 is assigned, the document ID 331 being delivered to the session management section 115 (step 479).

The session management section 115 receiving the document ID 331 judges whether or not a document comprising a plurality of pages is presently being displayed (step 481). When a document comprising a plurality of pages is presently being displayed, the session management section 115 specifies the ID of a document generating "interruption" as the next page 321 in the session management table 310 (step 483). When a document comprising a plurality of pages is not being displayed, the session management section 115 specifies the ID of a document generated as the next page 321 in the session management table 310 (step 485). And the contents in the customer status display section 141 to be next displayed are changed (step 487).

While the present invention has been described with reference to an example of applying the invention to internet techniques such as a web browser, a web server or the like, the invention is a technique applicable to communication systems using protocols other than internet protocols, because the invention is a technique enabling an agent to change a document to which a customer refers as the next page.

As has been described hereinbefore, the present invention can provide a system which is capable of intentionally changing the contents displayed on one information terminal, by another information terminal when collaboration is performed between a plurality of information terminals.

What is claimed is:

1. An information processing method that is executed within a system including a collaboration server connected to both a customer information terminal and an agent information terminal, said method comprising the steps of:

(a) sending a first message from said customer information terminal to said collaboration server, said first message giving instructions to perform collaboration;

(b) specifying an agent that collaborates with said customer information terminal;

(c) sending a second message to display an object on said customer information terminal along with predetermined information, said object giving instructions to send a next-page request;

(d) displaying first information and second information onto a screen of said agent information terminal, said first information specifying information being presently displayed on a screen of said customer information terminal and said second information specifying information to be next displayed on the screen of said customer information terminal;

(e) sending, in said agent information terminal, a third message to instruct said collaboration server to change said second information in response to receiving input giving instructions to change said second information;

(f) receiving, in said collaboration server, a fourth message generated by operating said object in said customer information terminal; and (g) sending third information from said collaboration server to said customer information terminal in response to receiving said fourth message, said third information being generated based on said third message received from said agent information terminal and including an object giving instructions to send a next-page request.

2. The method of claim 1, wherein said customer information terminal includes entries for inputting customer identifying information and position information; and wherein information input at said entries is saved as a cookie.

* * * * *

UNITED STATES PATENT AND TRADEMARK OFFICE
CERTIFICATE OF CORRECTION

PATENT NO. : 6,728,756 B1  
APPLICATION NO. : 09/576723  
DATED : April 27, 2004  
INVENTOR(S) : Ohkado It is certified that error appears in the above-identified patent and that said Letters Patent is hereby corrected as shown below:

Col. 1, line 52: after "further" delete "objectOive" and insert --objective--.

Signed and Sealed this

Twenty-seventh Day of March, 2007

JON W. DUDAS  
*Director of the United States Patent and Trademark Office*